Jan. 16, 1945.  E. C. WAHLBERG  2,367,319
FLUID DISTRIBUTOR
Filed May 13, 1942   3 Sheets-Sheet 1

INVENTOR.
Eric Clifton Wahlberg
BY Murray Robinson

Jan. 16, 1945.   E. C. WAHLBERG   2,367,319
FLUID DISTRIBUTOR
Filed May 13, 1942   3 Sheets-Sheet 2

INVENTOR.
Eric Clifton Wahlberg
BY Murray Robinson

Jan. 16, 1945.   E. C. WAHLBERG   2,367,319
FLUID DISTRIBUTOR
Filed May 13, 1942   3 Sheets-Sheet 3

INVENTOR.
Eric Clifton Wahlberg
BY Murray Robinson

Patented Jan. 16, 1945

2,367,319

UNITED STATES PATENT OFFICE 2,367,319

FLUID DISTRIBUTOR

Eric Clifton Wahlberg, Stamford, Conn., assignor to Electrolux Corporation, New York, N. Y., a corporation of Delaware Application May 13, 1942, Serial No. 442,840

9 Claims. (Cl. 137—146)

The invention relates generally to fluid distributors and in particular, to a valve for controlling the connection of air lines of different pressures to the rubber boots of a mechanical de-icer for an airplane.

The principal object of the invention is to construct a fluid distributor that is light in weight, efficient in operation, and with a minimum possibility of getting out of order.

Another object of the invention is to provide a rotary distributor which may be operated in either direction to obtain the same sequence of connections.

A further object of the invention is to provide a rotary distributor which operates in a step-by-step manner so as to give a maximum period with a full connection between the conduits and a minimum period of transition from one connection to another.

A further object of the invention is to provide a distributor which has a snap action when changing from one position to another so as to effect the transfer in as short a time as possible.

A further object of the invention is to provide a distributor which shall continue to function, even though the step-by-step or snap action drive connection shall have ceased to function.

Another object of the invention is to provide a distributor having a minimum number of exposed moving parts and which shall be small in size.

Another object of the invention is to provide a distributor embodying a rotary valve that engages closely with its seat to permit a minimum of leakage.

Further objects of the invention will appear as the description thereof proceeds.

Figure 1:
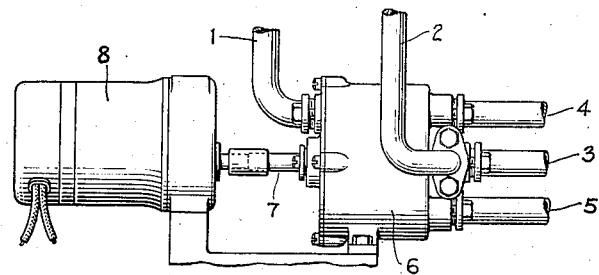
Figure 2:
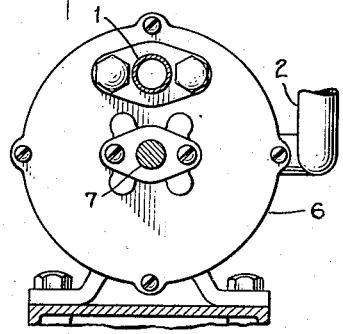
Figure 3:
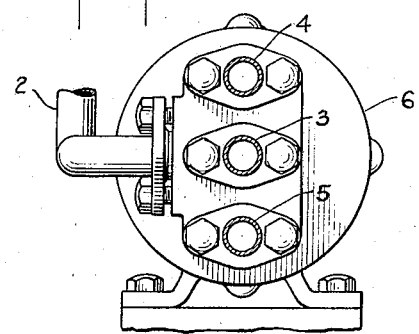
Figure 4:
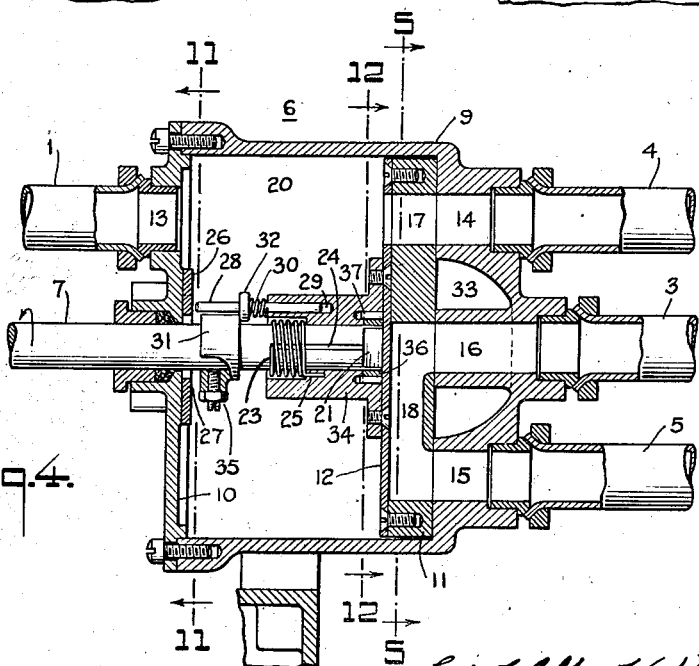
Figure 11:
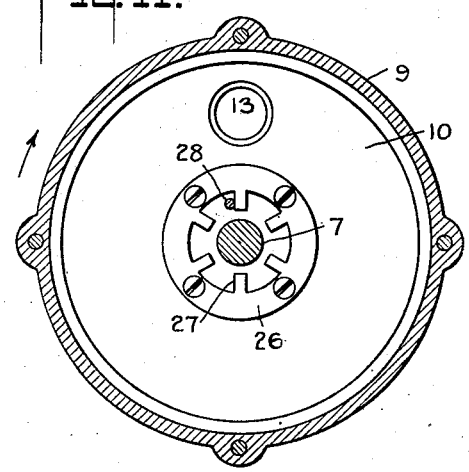
Figure 12:
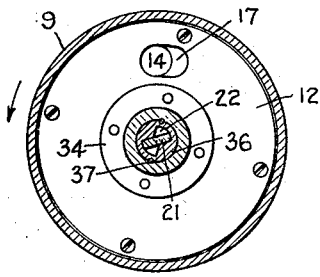
Figure 13:
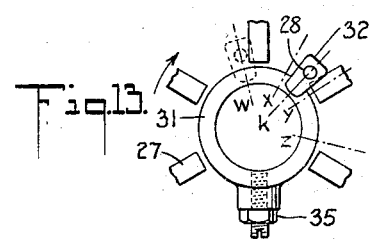
Figure 15:
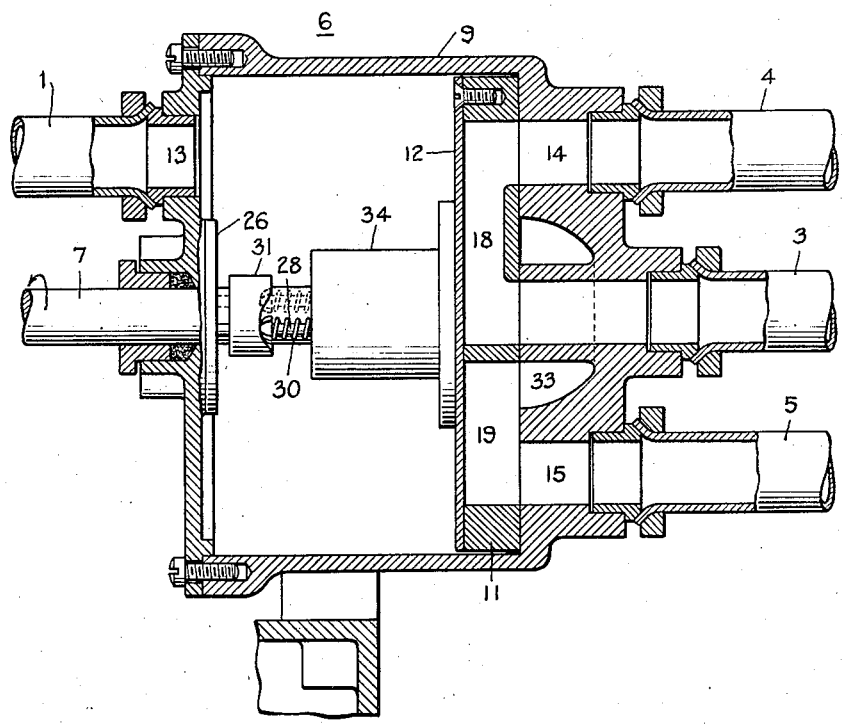
Figure 14:
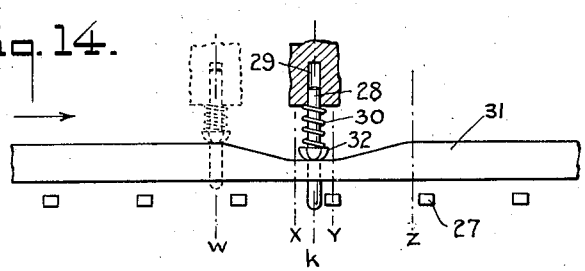

Referring to the drawings forming a part of this specification, Fig. 1 is a side elevation showing the distributor assembled with a drive motor and connected to pressure conduits. Fig. 2 is a left end view of the distributor shown in Fig. 1 and Fig. 3 is a right end view thereof. Fig. 4 is a vertical section through the distributor, showing the valve parts in one position. Figs. 5 through 10 are sections taken through the distributor on the line 5—5 of Fig. 4 looking in the direction of the arrows and showing the valve parts in various positions. Fig. 11 is a section taken on the line 11—11 of Fig. 4 looking in the direction of the arrows and Fig. 12 is a section taken on the line 12—12 of Fig. 4. Fig. 13 is a diagrammatic view of a part of the step-by-step mechanism and Fig. 14 is a similar view showing the mechanism as developed onto a flat surface. Fig. 15 is a view similar to Fig. 4, showing the parts in a different position.

In Fig. 1 there are shown pressure conduits 1, 2, and 3, adapted to be connected respectively to a supply of super-atmospheric pressure, the atmosphere, and a sub-atmospheric supply. Working conduits 4 and 5 may be connected to the boots of a mechanical de-icing equipment for an airplane. A distributor 6 is adapted to connect the pressure conduits to the working conduits as desired. Distributor 6 is driven through a shaft 7 from a motor 8.

As best shown in Figs. 4 and 15, the distributor 6 comprises a body 9, which may be an aluminum casting, to which is secured a cover plate 10. Within the body 9 there is a disc 11 which may be made of carbon or any other material which will wear well with aluminum or whatever substance of which the body 9 is composed. A plate 12 is secured to the disc 11 as by means of screws. There is an opening 13 in the plate 10 and there are openings 14, 15, 16, and 33 in the body 9 which are connected to conduits 1, 4, 5, 3, and 2 respectively. Passages 17, 18, 19 and 38 are formed in the disc 11 for the purpose of inter-connecting the conduits. The plate 10 and body 9 form a chamber 20 to one side of the disc 11 for housing the step-by-step mechanism. By leaving the entire face of plate 12 open to the pressure of conduit 1 the disc 11 is biased into engagement with the adjacent face of body 9 thereby sealing the valve disc against its seat.

There is a hub 34 secured to the plate 12 for driving the disc 11. The shaft 7 drives the hub 34 through key 21 which cooperates with slot 22 (Fig. 12) formed in laminations 36 which are secured in one end of the hub by means of pins 37. Another driving connection between shaft 7 and hub 34 comprises a spring 23 received in the other end of the hub and wound around the shaft 7. One end of the spring is secured within slot 24 in the shaft 7. The other end of the spring lies in an opening 25 formed in the hub 34. Since the opening in the hub 34 through which the shaft 7 passes is large enough to permit rotation of the hub about the shaft, it also permits a certain amount of rocking movement of the hub enabling the disc 11 to seat properly in body 9.

An annular disc 26, having internal stops 27 (best shown in Fig. 11) is secured to the plate 10. A pin 28 adapted to slide within opening 29 in the hub 34 is biased by means of spring 30 into a position wherein its end lies between the stops 27 of the disc 26. A cam 31 secured to shaft 7, as by means of a set screw 35, co-operates with cam follower 32 formed on the pin 28 to withdraw the pin from its position between the stops 27.

A developed view of the cam 31 is shown in Fig. 14. The cam is of uniform height excepting in the portion between the reference lines W and Z. In the portion between the reference line X and Y the cam is also of uniform height which is lower than the height of the rest of the cam. In the portions of the cam between reference lines W and X and between reference lines Y and Z there is a gentle slope of the cam to connect the high and low portions thereof. If desired, the flat section between the lines X and Y may be eliminated, leaving only a line of minimum height.

In operation, the distributor is driven through shaft 7 by motor 8. Assuming the parts to be in the position shown in Fig. 15, the pin 28 abuts against one of the stops 27, preventing movement of the hub 34. As the shaft rotates in the direction indicated by the arrow, the cam 31 will gradually lift the pin 28 out of its position between the stops 27, permitting the spring 23 which has been wound up to force the hub 34 forward in the same direction as the shaft 7. The spring will drive the hub 34 and with it the pin 28 into a position with respect to the cam 31 such that the pin may once more be forced in between two of the stops 27. Just before the pin engages the next stop 27, however, the side of slot 22 in the end of the hub will have come into engagement with the key 21 on the end of the drive shaft thereby preventing any shock on the pin 28 and giving it ample opportunity to become fully seated again. During this motion of the hub 34, the disc 11 will be moved so as to change the connections between the pressure conduits and the working conduits. A slight further motion of the shaft 7 will cause the pin 28 to abut against the next stop 27, preventing further motion of hub 34. The new position of the pin is shown in dotted lines in Fig. 15. Upon continued motion of the shaft, spring 23 will again be wound up. cam 31 will again ride up beneath the cam follower 32 on pin 28, forcing it into recess 29 and removing it from engagement with stop 27. The hub 34 will again be free and will be forced into a new position corresponding to that shown in Fig. 4. In Fig. 4 the pin is shown in its position just as the cam 31 has again released it upon further motion of shaft 7 and just before hub 34 has started to move another time. Thus, the disc 11 is moved in a step-by-step manner and with a snap action from one position to another so as to successively connect the pressure conduits 1, 2, and 3 with the working conduits 4 and 5. If the direction of rotation of shaft 7 be reversed, the operation is the same except that spring 23 is stressed upon displacement of hub and shaft by unwinding from its normal position.

Figure 5:
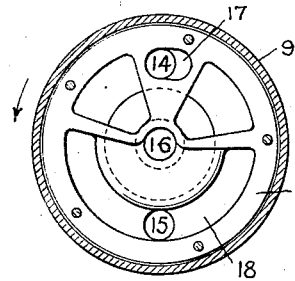
Figure 6:
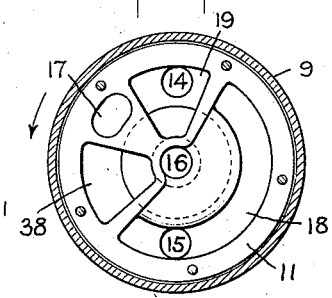
Figure 7:
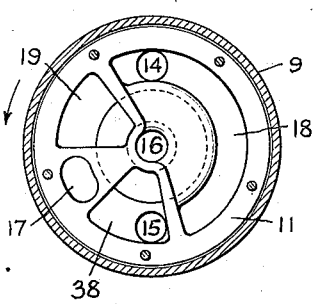
Figure 8:
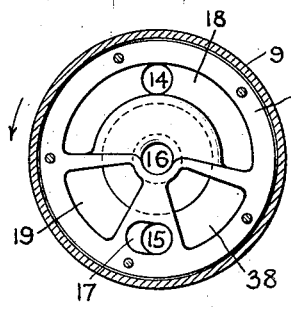
Figure 9:
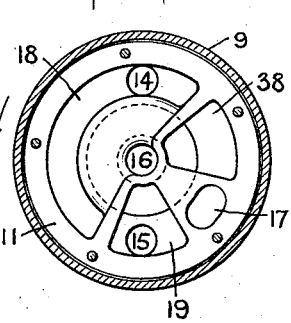
Figure 10:
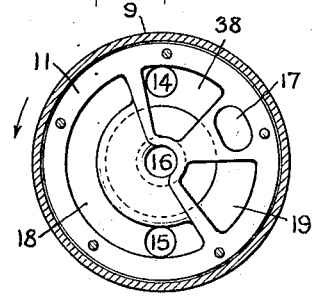

Referring to Figs. 5 through 10, the disc 11 is shown in its various positions. In Fig. 5, passage 17 in the disc 11 lies over opening 14 in the body 9, thereby connecting pressure chamber 20 to working conduit 4. Working conduit 5 is connected through opening 15 in body 9 and passage 18 in disc 11 to opening 16 connected to the sub-atmospheric or suction conduit 3. This is the same position as shown in Fig. 4. In Fig. 6, working conduit 4 is connected to the atmospheric pressure conduit and conduit 5 is connected to the suction supply. In Fig. 7, conduit 4 is connected to the source of suction and conduit 5 is connected to the atmosphere. In Fig. 8, conduit 4 is connected to the source of suction and conduit 5 is connected to the super-atmospheric pressure line. In Fig. 9, conduit 4 is connected to suction and 5 to atmosphere. This is the same position as shown in Fig. 15. Working conduit 4 is connected through opening 14 and passage 18 to suction conduit 3. Working conduit 5 is connected through passage 19 to opening 33 which connects at one side to atmospheric conduit 2. (See Figs. 1, 3, and 4.) In Fig. 10, conduit 4 is connected to atmosphere and 5 to suction. The connection of working conduit 4 to atmosphere is through opening 14 and passage 38 to opening 33 which is connected to atmospheric conduit 2, similar to the connection of working conduit 5 to atmosphere as shown in Figs. 9 and 15. In Figs 8, 9, and 10, pipes 4 and 5 are connected just the reverse from the way they are connected in Figs. 5, 6, and 7.

The direction of rotation of the disc 11 as it moves from one position to the other is shown by the arrows on the drawings. If desired, however, the shaft 7 could be driven in the opposite direction and the sequence of connections to the working conduits would still be the same, for the passageways in the disc 11 are arranged symmetrically, and the passages are of sufficient width so that they will register completely with openings 14 and 15, regardless of the direction in which the apparatus is driven. The minimum width of any passage is the width of one of the openings connecting to the working conduits, plus the distance through which the passage moves when the shaft is driven from a position in which the pin 28 engages with opposite sides of a single stop 27. The opening 17 in the illustrated embodiment is of such a minimum width.

Since the particular distributor disclosed is intended for use with de-icing equipment of an airplane, certain characteristics of the de-icing equipment determine the size of the passages in the disc 11 in the particular embodiment of the distributor shown. First of all, it is desirable to apply super-atmospheric pressure to the boots of the de-icer for as short a time as possible because expansion of the rubber boots of the de-icer increases the drag of the airplane. It is for this reason that the high pressure passage 17 is of minimum width.

For economy of operation, it is desirable to connect the boots to atmosphere both before connecting them to super-atmospheric pressure and before connecting to suction in order that the pump supplying the pressure lines may have to do as little work as possible. The boots should be connected to atmosphere as soon as possible after they have been inflated so as to bring them back to a deflated condition, thus reducing the period of increased drag on the airplane. Accordingly, the atmospheric pressure passages 19 and 38 in the disc 11 are placed as close as possible to the passage 17 without reducing the strength of the disc too much.

It has been found that at high speeds deflated rubber boots tend to bulge outwardly at certain points where the pressure outside is reduced below static atmospheric pressure because of the motion of the airplane through the air. In order to prevent this bulging which also increases the drag on the airplane, the boots may be connected to a sub-atmospheric pressure while they are deflated, thus preventing bulging of the boots. Accordingly, it is desirable to connect the boots to the sub-atmospheric pressure as soon as possible after they have been disconnected from atmospheric pressure. This means that the sides of the suction passage 18 must be as close as possible to the sides of the atmospheric pressure passages 19 and 38 without reducing the strength of the disc 11 too much; also that the adjacent sides of the atmospheric passages 19 and 38 should be as near as possible to their opposite sides while still leaving sufficient passage to register completely with opening 14 and 15 when disc 11 is in one of its dwell positions, regardless of the direction in which the apparatus is driven. Thus, for the particular use shown, the exact size and extent of the passages in the disc 11 is determined.

Having described the operation of the distributor in connection with de-icing equipment, it should be pointed out that the chief reason for having a snap action, step-by-step drive for the distributor is to apply the super-atmospheric pressure to the boots in as short a time as possible, thereby increasing the ice-breaking effect of the expansion of the boots. However, should the step-by-step mechanism fail to operate properly, the positive drive between shaft 7 and hub 34 comprising key 21 and slot 22 will cause the distributor to continue to function in a manner that will be satisfactory in most instances.

Referring to Figs. 13 and 14, considerations entering into the design of the profile of the cam 31 may be described. There is shown in dotted lines at the top of Fig. 13 and at the left of Fig. 14 the position of the pin 28 just as it is lifted out of locking engagement with the adjacent stop 27. In this position the cam-follower 32 is immediately over the junction between the high portion of the cam and the beginning of the slope from the high portion of the cam to the low portion thereof. This junction is indicated by the dashed line W. In full lines there is shown the position of the pin 28 and cam-follower 32 after the pin has snapped into its new position. The pin 28 is not quite in engagement with the next stop 27 for the slot in hub 34 engages key 21 and prevents the hub from being moved that far by the spring 23. The portion of the cam just below the cam-follower in this position is indicated by dashed line K. Between W and K the cam slopes from its high portion to its low portion. If desired, the slope may terminate at X leaving a flat portion between X and K. The width of the flat portion depends on the steepness of the slope between W and X.

Should the apparatus be driven in the opposite direction from that indicated in the drawing, the cam must be so designed as to take up promptly its function of lifting the cam-follower and pin to permit motion of the hub. To avoid overstressing the spring 23, the cam should be designed so as to come into action as soon as pin 28 strikes a stop upon reversal of the mechanism. Since K represents the position of cam and follower in which the spring 23 is stressed to a minimum, it is obvious that for reversibility the cam should be designed symmetrically about line K.

While there has been described a particular embodiment of the apparatus for use in connection with de-icing equipment for an airplane, it is obvious that many modifications therein may be made and that the apparatus may be used for other purposes without departing from the spirit of the invention. For example, in certain applications where it is merely desired to cyclically distribute fluid under pressure to one or more working conduits, the step-by-step and snap action mechanism might be eliminated and the plate 10 mounted closely adjacent to the disc 11, thereby reducing the size of the chamber 20. If desired, two springs wound oppositely could be used to connect the hub 34 and shaft 7 so that regardless of the direction of rotation there would always be one spring that was stressed by being wound up more tightly. If reversibility were not a requisite, a single pre-stressed spring could be used to increase the rapidity of operation of the step-by-step mechanism. It is intended to cover by Letters Patent all phases of the invention following within the scope of the appended claims.

I claim:

1. In a step-by-step drive mechanism, a drive shaft, a driven member, a spring wound around the shaft and secured in permanently fixed relation thereto at one point and secured in permanently fixed relation to said member at another point, a pin slidable in a recess in the member, a plurality of fixed abutments, a spring biasing the pin into locking engagement with said abutments in such a manner as to prevent movement of said member with respect to said body, and a cam fixed to said drive shaft adapted to move said pin out of engagement with the abutments, said cam being so shaped as to unlock the pin when the drive shaft has been moved through a distance such that said member will be moved to its next position by the first mentioned spring.

2. In a step-by-step drive mechanism, a drive shaft, a driven member, a spring wound around the shaft and secured in permanently fixed relation thereto at one point and secured in permanently fixed relation to said member at another point, a pin slidable in a recess in the member, a plurality of fixed abutments, a spring biasing the pin into locking engagement with said abutments in such a manner as to prevent movement of said member with respect to said body, a cam fixed to said drive shaft adapted to move said pin out of engagement with the abutments, said cam being so shaped as to unlock the pin when the drive shaft has been moved through a distance such that said member will be moved to its next position by the first mentioned spring, and means for preventing relative movement between said shaft and said member more than said distance.

3. In a step-by-step drive mechanism, a drive shaft, a driven member, a spring wound around the shaft and secured in permanently fixed relation thereto at one point and secured in permanently fixed relation to said member at another point, a pin slidable in a recess in the member, a plurality of fixed abutments, a spring biasing the pin into locking engagement with said abutments in such a manner as to prevent movement of said member with respect to said body, and a cam fixed to said drive shaft adapted to move said pin out of engagement with the abutments, said cam being so shaped as to unlock the pin when the drive shaft has been moved through a distance such that said member will be moved to its next position by the first mentioned spring regardless of the direction of rotation of the drive shaft.

4. In a step-by-step drive mechanism, a drive shaft, a driven member, a spring wound around the shaft and secured in permanently fixed relation thereto at one point and secured in permanently fixed relation to said member at another point, a pin slidable in a recess in the member, a plurality of fixed abutments, a spring biasing the pin into locking engagement with said abutments in such a manner as to prevent movement of said member with respect to said body, and a cam fixed to said drive shaft adapted to move said pin out of engagement with the abutments, said cam being so shaped as to unlock the pin when the drive shaft has been moved through a distance such that said member will be moved to its next position by the first mentioned spring regardless of the direction of rotation of the drive shaft and so that the first mentioned spring will not be stressed more upon rotation in one direction than in the other.

5. In a fluid distributing device, a housing having a plane surface therein forming a valve seat formed with a plurality of ports, a driving shaft rotatably mounted in said housing, a valve member rotatably mounted in said housing and having a plane surface in sliding contact with said seat, and means including a resilient coupling between said shaft and said member for rotating the latter with a step-by-step motion, said valve member being free by virtue of said resilient coupling to seat against said seat without regard to alignment with said shaft.

6. In a step-by-step drive mechanism, a driving member, a driven member, a resilient coupling connecting said members, a plurality of fixed abutments, a movable detent carried by said driven member and engageable with said abutments to restrain rotation of said driven member, and means carried by said driving member for moving said detent out of engagement with said abutments.

7. In a step-by-step drive mechanism, a driving member, a driven member, a resilient coupling connecting said members, a plurality of peripherially spaced fixed abutments, a movable detent carried in rotation by said driven member and engageable in succession with said abutments to restrain rotation of said driven member, means carried by said driving member for moving said detent out of engagement with any of said abutments to thereby permit said resilient coupling to drive said driven shaft at a speed greater than that of said driving shaft, and loose coupling means between said members for reducing the speed of the driven member to that of the driving member before said detent engages the next abutment.

8. In a step-by-step drive mechanism, a driving member, a driven member, a resilient coupling connecting said members, a plurality of fixed abutments, an axially displaceable pin carried by said driven member, means for biasing said pin into engagement with said abutments, and cam means on said driving member for moving said pin out of engagement with said abutments.

9. In a step-by-step drive mechanism, a driving member, a driven member, a resilient coupling connecting said members, a plurality of peripherially spaced fixed abutments, a movable detent carried in rotation by said driven member and engageable in succession with said abutments to restrain rotation of said driven member, means carried by said driving member for moving said detent out of engagement with any of said abutments to thereby permit said resilient coupling to drive said driven shaft at a speed greater than that of said driving shaft, and loose coupling means between said members for reducing the speed of the driven member to that of the driving member before said detent engages the next abutment and for driving said driven member continuously in the event of failure of said resilient coupling.

ERIC CLIFTON WAHLBERG.